(12) United States Patent
Carter

(10) Patent No.: US 6,859,213 B1
(45) Date of Patent: Feb. 22, 2005

(54) METHOD AND APPARATUS FOR SELECTING ATTACHMENTS

(75) Inventor: Kapono D. Carter, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/046,784

(22) Filed: Mar. 23, 1998

(51) Int. Cl.[7] ............................................. G09G 5/00
(52) U.S. Cl. ....................... 345/752; 345/760; 345/739
(58) Field of Search ............................... 345/700, 733, 345/738–739, 752, 760, 764, 804, 810, 835, 841, 853, 854, 357, 326, 329, 335, 339, 346, 348, 352, 356; 715/512–513; 707/512, 513

(56) References Cited

U.S. PATENT DOCUMENTS

| | | | |
|---|---|---|---|
| 5,291,585 A | 3/1994 | Sato et al. .................... 709/301 |
| 5,335,320 A | 8/1994 | Iwata et al. ................... 395/704 |
| 5,345,550 A | 9/1994 | Bloomfield .................. 345/353 |
| 5,347,627 A | 9/1994 | Hoffmann et al. .......... 345/334 |
| 5,384,911 A | 1/1995 | Bloomfield .................. 345/333 |
| 5,412,772 A | 5/1995 | Monson ....................... 345/335 |
| 5,414,806 A | 5/1995 | Richards ...................... 345/435 |
| 5,418,908 A * | 5/1995 | Keller et al. ................ 709/206 |
| 5,423,034 A | 6/1995 | Cohen-Levy et al. ......... 707/10 |
| 5,430,836 A | 7/1995 | Wolf et al. ................... 345/335 |
| 5,436,637 A | 7/1995 | Gayraud et al. ............. 345/116 |
| 5,448,695 A | 9/1995 | Douglas et al. .............. 345/347 |
| 5,461,399 A | 10/1995 | Cragun ........................ 345/145 |
| 5,461,710 A | 10/1995 | Bloomfiled et al. ......... 345/349 |
| 5,473,745 A | 12/1995 | Berry et al. ................. 345/340 |
| 5,491,784 A | 2/1996 | Douglas et al. ............. 345/352 |
| 5,493,638 A | 2/1996 | Hooper et al. ............... 345/435 |
| 5,509,116 A | 4/1996 | Hiraga et al. ................... 707/1 |
| 5,526,517 A | 6/1996 | Jones et al. ..................... 707/8 |
| 5,544,288 A | 8/1996 | Morgan et al. .............. 345/342 |
| 5,546,519 A | 8/1996 | Berry .......................... 345/326 |
| 5,548,702 A | 8/1996 | Li et al. ...................... 345/346 |

(List continued on next page.)

OTHER PUBLICATIONS

Definition List compiled from the Internet (pp. 1–4).*
Screen dumps of Microsoft Word 97 (pp. 1–8; 1996).*
Screen dumps of Windows NT 4.0 Explorer (pp. 1–5; Jan. 15, 1997 or prior).*
Screen dump of an Amazon.com webpage showing a book on Windows NT 4.0 and its published date of Jan. 15, 1997.*
Ronald L. Johnston, "The Dynamic Incremental Compiler of APL/3000" Proceedings of the API '79 Conference, published as APL Quote Quad, 9(4), p 82–87.
Leo J. Guibas et al., "Compilation and Delayed Evaluation in APL," Fifth Annual Synposium on Principles in Programming Languages, p 1–8, 1978.
Gleen Krasner "The Smalltalk–80 Virtual Machine" BYTE Publications Inc., Aug. 1991, pp 300–320.

*Primary Examiner*—Sy D. Luu
(74) *Attorney, Agent, or Firm*—Martine & Penilla, LLP

(57) ABSTRACT

A method and apparatus for selecting attachments. When a sender indicates in an e-mail application or applet that an attachment is to be associated with an e-mail message, an attachment chooser window is presented. The attachment chooser window provides a browser-based graphical user interface (GUI) which allows a sender to browse data resources, such as HTML documents and associated links. An attachment mechanism is provided by which a sender can choose a currently displayed data resource for attachment in an e-mail message. In one embodiment, the attachment mechanism allows a user to select whether the attachment is retrieved and attached to an e-mail message as a resource locator (such as a URL) of the chosen data resource, or whether source data of the data resource is retrieved and attached to the e-mail message as one or more source files.

38 Claims, 8 Drawing Sheets

U.S. PATENT DOCUMENTS

| | | | | |
|---|---|---|---|---|
| 5,550,968 A | | 8/1996 | Miller et al. | 345/332 |
| 5,559,942 A | | 9/1996 | Gough et al. | 345/349 |
| 5,564,003 A | | 10/1996 | Bell et al. | 345/326 |
| 5,566,330 A | | 10/1996 | Sheffield | 707/4 |
| 5,570,462 A | | 10/1996 | McFarland | 345/436 |
| 5,572,643 A | | 11/1996 | Judson | 709/218 |
| 5,694,603 A | | 12/1997 | Reiffin | 709/107 |
| 5,694,604 A | | 12/1997 | Reiffin | 709/107 |
| 5,737,560 A | * | 4/1998 | Yohanan | 345/349 |
| 5,771,355 A | * | 6/1998 | Kuzma | 395/200.62 |
| 5,781,901 A | * | 7/1998 | Kuzma | 707/10 |
| 5,790,793 A | * | 8/1998 | Higley | 709/218 |
| 5,799,318 A | * | 8/1998 | Cardinal et al. | 707/104 |
| 5,890,172 A | * | 3/1999 | Borman et al. | 707/501 |
| 5,903,723 A | * | 5/1999 | Beck et al. | 395/200.3 |
| 6,002,402 A | * | 12/1999 | Schacher | 345/810 |
| 6,072,491 A | * | 6/2000 | Yohanan | 345/835 |
| 6,078,921 A | * | 6/2000 | Kelley | 707/10 |
| 6,340,980 B1 | * | 1/2002 | Ho | 345/776 |
| 6,574,620 B2 | * | 6/2003 | Borovoy et al. | 707/3 |
| 6,647,391 B1 | * | 11/2003 | Smith et al. | 707/100 |

* cited by examiner

METHOD AND APPARATUS FOR SELECTING ATTACHMENTS

COMPUTER PROGRAM LISTING APPENDIX

Appendix A to this specification is a computer program listing appendix provided on compact disc and is incorporated herein by reference. Appendix A provides Documentation for the Document Stack Bean and the HotJava HTML Component referred to in the specification. Appendix A is provided on two CD-R compact discs entitled "Copy 1" and "Copy 2", each containing one file named "APPENDIX A.txt", created on Mar. 6, 2001, and having a size of 43,116 bytes.

BACKGROUND OF THE INVENTION

1. Field of the Invention

This invention relates to the field of computer software, and, more specifically, to electronic mail applications.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever. Sun, Sun Microsystems, the Sun logo, Java, JavaBeans, HotJava and all Java-based trademarks and logos are trademarks or registered trademarks of Sun Microsystems, Inc. in the United States and other countries.

2. Background Art

With the proliferation of personal computers and communications networks, electronic mail, commonly referred to as "e-mail," has become a popular mechanism for the exchange or distribution of information among individuals, and within or between enterprises, for both private and commercial purposes. An e-mail message may be generated by a "sender" using an email application on the sender's computer system, and transmitted over a communications network to a "receiver" on another computer system. The receiver is able to view the e-mail message using his own e-mail application.

One utility of many e-mail systems is the ability to "attach" previously authored information to an e-mail message. These "attachments" are transmitted with the e-mail message. Common forms of attached information include text files, graphics files and other forms of bounded data. With the development of the World Wide Web (WWW), also referred to simply as "the web", e-mail attachments have expanded to include web pages (e.g., HTML (hypertext markup language) documents) and URL's (universal resource locators) for web pages. These attachments are typically identified during construction of an e-mail message by typing or pasting the name of the file or the URL of the web page in a dialog entry window, or by perusing a file directory in order to select a file from a hierarchical list. Unfortunately, there is no mechanism within the e-mail application for previewing an attachment prior to selection, or for browsing for an attachment. This presents a particular disadvantage when selecting attachments associated with the World Wide Web, as a hierarchical list of linked web pages is typically not available and a user may not know the URL of a specific web page offhand. E-mail applications and the associated drawbacks may be better understood from an overview of electronic mail with reference to a known e-mail application.

Electronic Mail

An e-mail message may be analogized to a posted letter or piece of mail. However, instead of a physical object that is itself physically transported from a sender to a receiver, an e-mail message is an electronic representation that is communicated electronically through a communications network. Examples of communications networks used for communicating e-mail messages include, but are not limited to, tel-com networks, wide area networks (WANs), local area networks (LANs), the Internet, the World Wide Web, intranets, extranets, wireless networks, and other networks over which electronic, digital, and/or analog data may be communicated.

E-mail messages are created, sent, received, and read using a communications program, often referred to as a "mail" or "e-mail" application program. An image of an interface of one e-mail program is illustrated in FIG. 2. The example is the interface of the mail module of Netscape Communicator, an internet browser application. The interface consists of a window 200 with a row of control buttons 201–210 across the top, headers 212–215 below the buttons, and a field that displays a list of messages. In the example of FIG. 2, the list indicates a single message 216 represented by an icon with adjacent text indicating the subject, namely "Meeting on the 20th", from "Sender" and created at 9:20 PM.

The buttons are used to create and modify messages. Button 201, "Get Msg" is used to open a message that has been selected in the list (messages can also be opened by double clicking on them). Button 202, "New Msg" is used to create a new message form that can be completed and mailed to a receiver. "Reply" button 203 is used to generate a reply form to a message that is currently in view. When activated, a message form is generated that has as its address the address of the sender of the message being viewed. Optionally, the reply message may include the entire text of the sender's message. "Forward" button 204 generates a message form that includes the sender's message, but with a blank address, so that the message may be optionally annotated and forwarded to another receiver.

Button 205, "File", is used to save a message into a file in a text or other format. Button 206, "Print", is activated to print the message on an attached printer. "Security" button 208 activates security options for a message such as encryption, use of a digital certificate, or digital signature features, for example. Messages can be deleted by the "Delete" button 209. "Stop" button 210 is used to interrupt or stop operations.

Headers above the message list indicate such information as "Subject" 212, "To/From" 213, "Date" 214, and "Priority" 215. Messages in the list can be sorted by subject, by sender or receiver, by ascending or descending date, by urgency, or by any combination thereof.

An e-mail message generated using the example mail program of FIG. 2 is illustrated in FIG. 3. The e-mail message 216 includes a palette of buttons 301–306, along with buttons 208 and 210 from FIG. 2. An address field 307 indicates that the message is being sent to "Receiver@receiver.com". A subject field 308 shows the subject as "Meeting on the 20th". The body of the message is displayed in field 309.

The "Send" button 301 is activated to initiate the transmission of the message from the sender to the receiver. The "Quote" button 302 is used to insert the body of the text from a previous message into the body 309 of a current message. The "Address" button 303 prompts the sender to enter an address of the receiver or to select an address from some stored address book. The "Spelling" button 305 performs a spell check on the message text, and the "Save" butt on 306 is used to save a message as a text file.

The "Attach" button 304 is used to attach one or more electronic files to the e-mail message. Often a sender wishes to send one or more files to a receiver. One method of sending a file to a receiver would be to copy the information from the file (e.g. the text from a text file) and paste that information into the message field 309 of an e-mail message. If the file is large, this may not be possible. Some e-mail systems have limitations on the size of the body of an e-mail message so that some files may be too large to be entered into the body of an e-mail message. In other cases, the files represent non-text data, such as sound, images, or movies, for example, that cannot be easily pasted into an e-mail message. In such circumstances, the attach feature is used.

When the attach button 304 is activated, a dialogue box appears that allows the sender to navigate through a file system and select files to be attached to the e-mail message. Navigation is typically performed using a hierarchical list of file names. After one or more files are selected, the sender transmits the e-mail message and attached file(s) to a receiver. When the receiver reads the message, there is an indicator that one or more files are attached. The receiver activates the attach button and is presented with a dialogue box that enables the receiver to retrieve the attached file or files and place them somewhere in the receiver's file system.

When a sender wishes to attach HTML documents and other web-based information to an e-mail message, the sender uses the hierarchical list of file names to locate the desired document, or the sender specifies, such as through a text entry mechanism, a URL for each HTML document. Each web page is comprised of one or more separate files in a file system. These files can include, for example, an HTML document and text, graphics and sound files identified by "tags" within the HTML document. Web pages are typically linked to other web pages via embedded URL's. In many cases, dozens of web pages are linked to each other to form a related presentation of data. To send such linked pages using e-mail, each page is attached to an e-mail message for sending to a receiver.

SUMMARY OF THE INVENTION

A method and apparatus for selecting attachments is described. When a sender indicates in an e-mail application or applet that an attachment is to be associated with an e-mail message, an attachment chooser window is presented. The attachment chooser window provides a browser-based graphical user interface (GUI) which allows a sender to browse data resources, such as HTML documents and associated links. An attachment mechanism is provided by which a sender can choose a currently displayed data resource for attachment in an e-mail message. In one embodiment, the attachment mechanism allows a user to select whether the attachment is retrieved and attached to an e-mail message as a resource locator (such as a URL) of the chosen data resource, or whether source data of the data resource is retrieved and attached to the e-mail message as one or more source files.

In an embodiment of the invention, an attachment chooser software component is instantiated by an e-mail application. The attachment chooser software component is configured to provide the graphical user interface for selecting a web-based attachment, and comprises the following components: a menu component configured to control how an attachment is added to an e-mail message, e.g., as a resource locator or as source data; an editable "go-to" text field component configured to identify the resource locator of the currently viewed data resource; a toolbar component providing the basic navigation controls for browsing data resources such as web pages; a browsing component configured to perform parsing and rendering of data resources; and one or more button components configured to receive input to attach a currently viewed data resource to an e-mail message or to cancel an attachment session.

DETAILED DESCRIPTION OF THE INVENTION

The invention is a method and apparatus for selecting attachments. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

An embodiment of the present invention provides for navigation and browsing of data resources, such as text, graphics and audio source data, when selecting attachments for an e-mail message. These data resources may also include source data containing data written in a markup language (e.g., HTML) that may be rendered by a browsing mechanism, and source data containing links such as embedded resource locators (e.g., URL's or other location references to data resources) that may be used by a browsing mechanism to navigate from one data resource to another. Data resources may contain source data in the form of one or more files, documents, streams and other sources of electronic information, or portions thereof.

By providing the ability to view the contents of prospective attachments before they are attached, a sender is able to confirm that the attachment contains the data expected. Also, via the browsing feature, a sender using an embodiment of the invention has access to advanced search engines on the web to further assist in the location of desired attachments. Advanced search features are not available in e-mail systems of the prior art.

In an embodiment of the invention, linked data resources can be traversed through standard browsing operations in order to locate a desired attachment. This is an advantage over navigation of a hierarchical list of file names, because a hierarchical file list does not provide information regarding possible embedded links to other files that may exist for web pages and other types of compound or linked documents. Further, web links via URL typically have little or no correspondence to particular file system hierarchies and often transcend single file systems, necessitating, in systems of the prior art, that the sender have knowledge of the particular URL's or the respective file names and directories for the web page or pages that are to be attached to an e-mail message.

Figure 7:
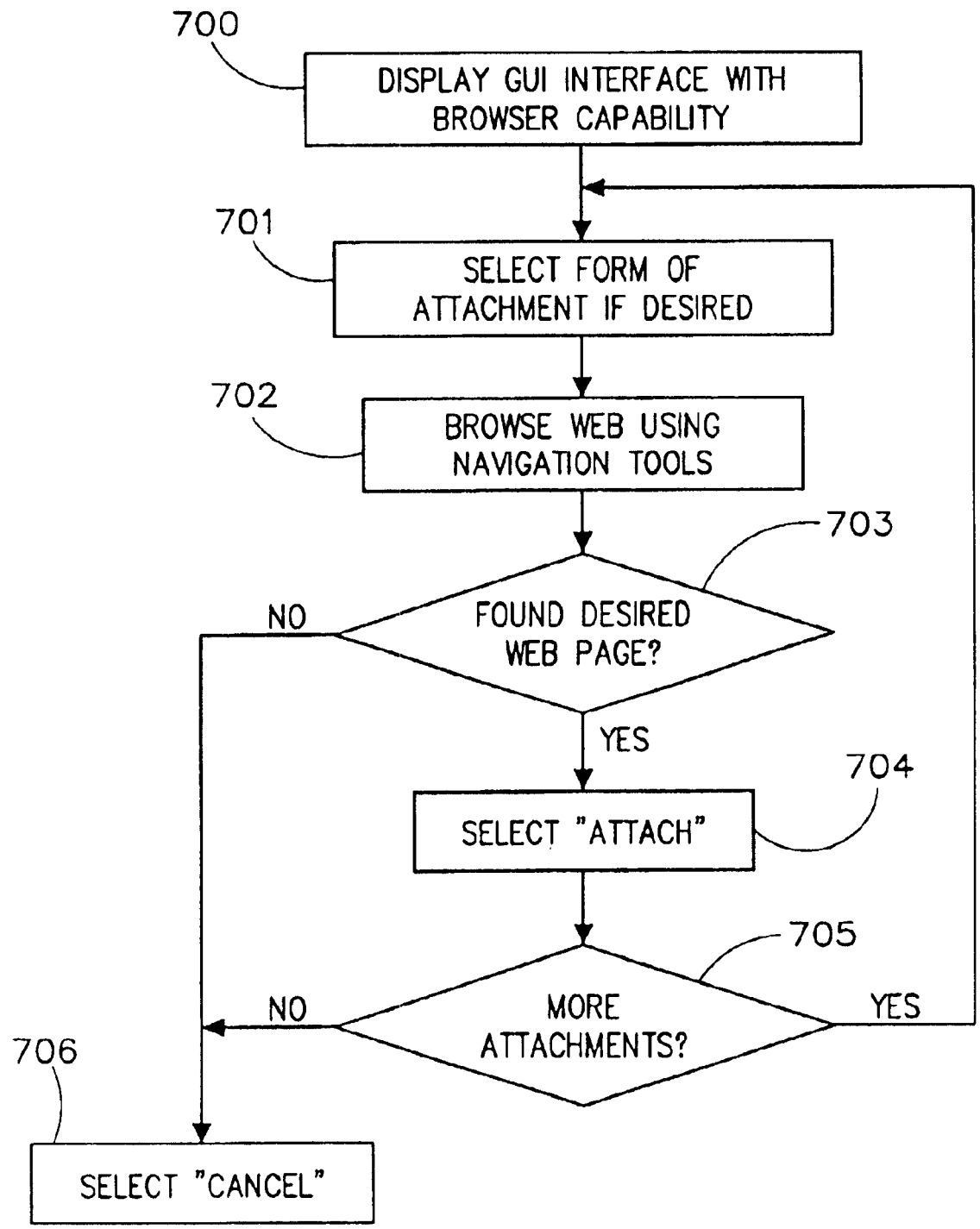
FIG. 7 is a flow diagram of a method for selecting attachments in accordance with an embodiment of the invention.

FIG. 7 illustrates a method for selecting attachments in accordance with an embodiment of the invention. In step 700, during composition of an e-mail message, when a sender expresses a wish to select an attachment, a graphical user interface (GUI) with browser capability is presented to the sender. If the GUI interface is equipped with an attachment menu, the sender may select the type of the prospective attachment from the menu in step 701. Examples of types of attachment include attachment as a resource locator, such as a URL (universal resource locator), and attachment as source data of the chosen data resource, such as the set of data bits forming a rendered HTML document, or web page. An attachment may be retrieved as all source data of a chosen data resource or a subset thereof.

In step 702, the sender uses the browser capability of the GUI interface to navigate through the web using a navigation tool set or by selecting links within displayed data resources such as HTML documents. The browsable web may include the World Wide Web or it may comprise a constrained local web.

If the desired web page or other data resource is not found in step 703, the sender selects "cancel" from the GUI interface in step 706 and dismisses the GUI interface. If a desired web page or other data resource is found in step 703, the sender selects "attach" from the GUI interface and the selected attachment is attached to the e-mail message. If the sender does not wish to select any further attachments in step 705, the user selects "cancel" in step 706 to dismiss the GUI interface. However, if further attachments are desired in step 705, the method returns to step 701.

The following description discloses embodiments of apparatus for implementing the method of selecting attachments disclosed above with respect to FIG. 7. Description is provided of a GUI interface in accordance with an embodiment of the invention. The discussion of the GUI interface embodiment is followed by description of software apparatus configured to implement the GUI interface and provide for selection of attachments in accordance with an embodiment of the invention. First, however, description is given below of an embodiment of computer apparatus suitable for providing an execution environment for the software apparatus of the invention.

Embodiment of Computer Execution Environment (Hardware)

Figure 1:
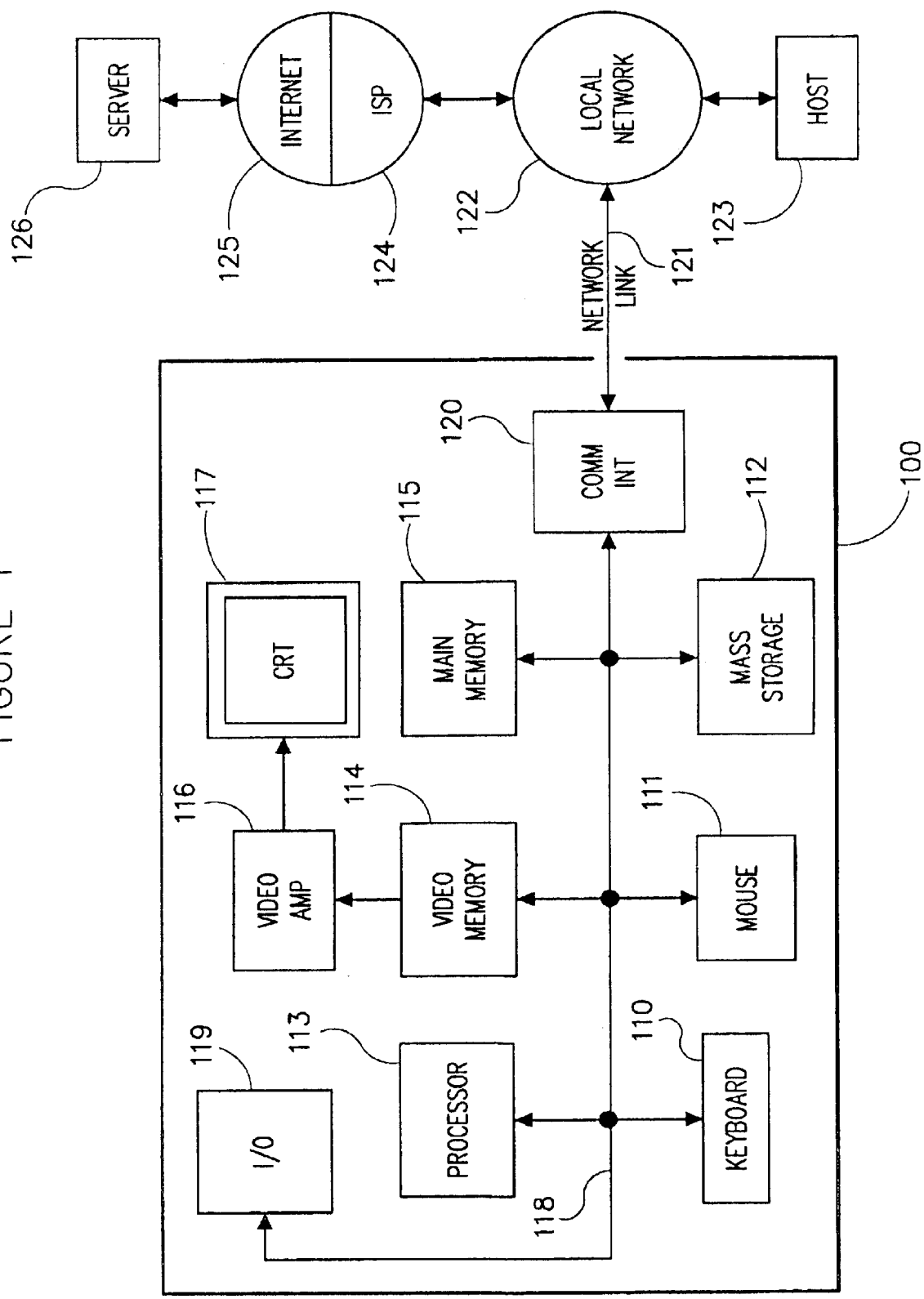
FIG. 1 is a block diagram of one embodiment of a computer system capable of providing a suitable execution environment for an embodiment of the invention.
Figure 2:
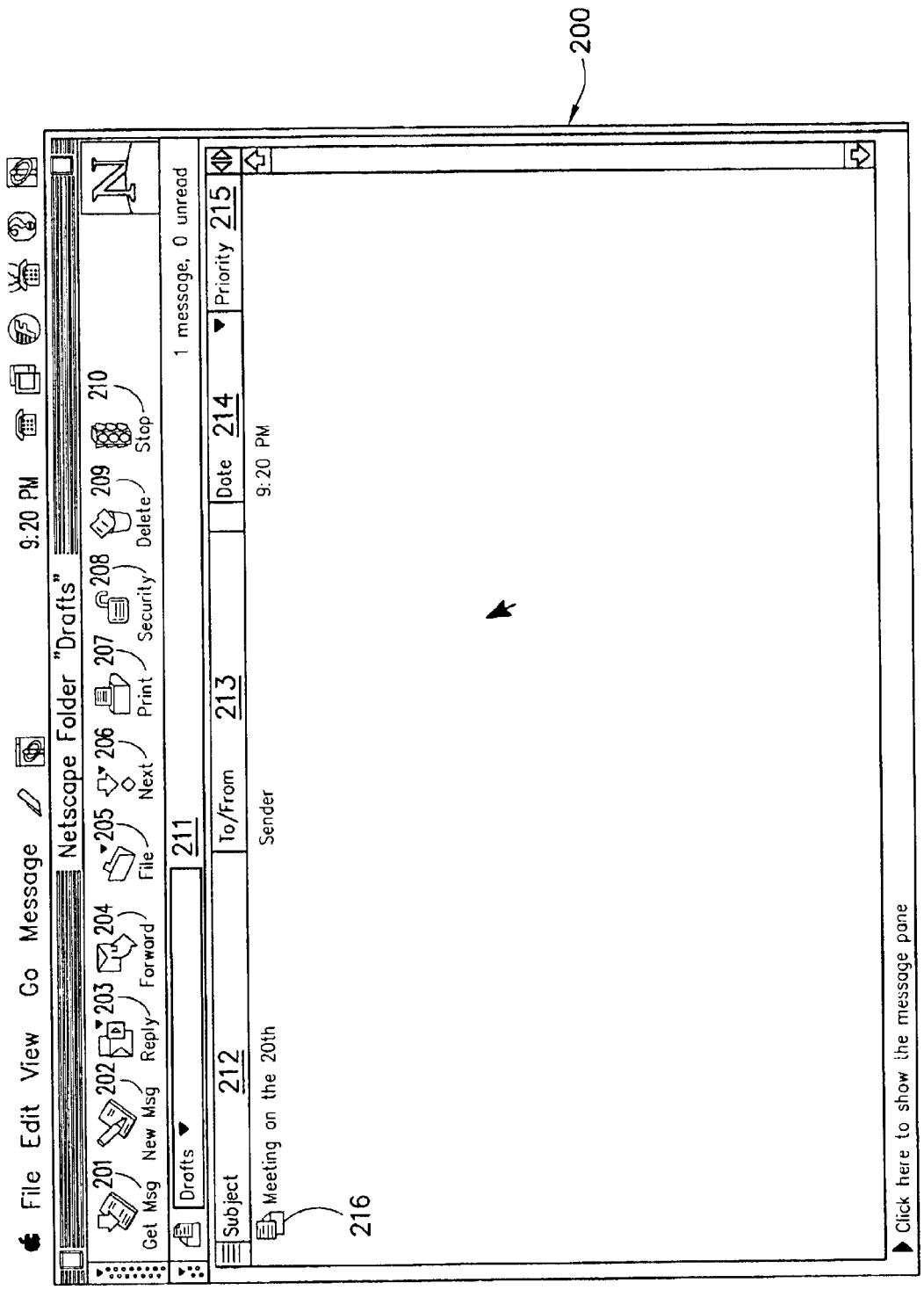
FIG. 2 is an illustration of a graphic user interface (GUI) for a known e-mail application.
Figure 3:
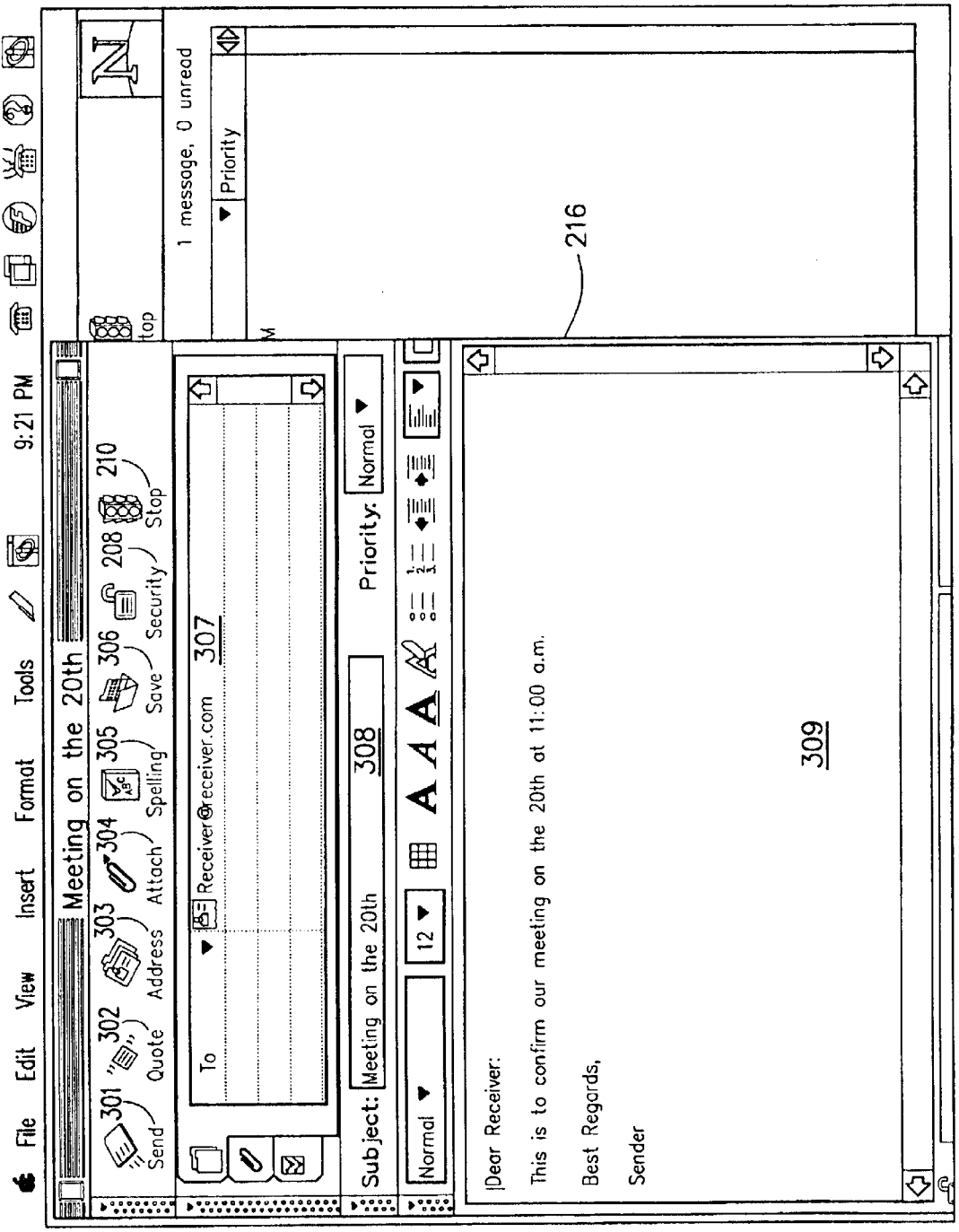
FIG. 3 is an illustration of a graphic user interface for e-mail message composition in a known e-mail application.

An embodiment of the invention can be implemented as computer software in the form of computer readable code executed on a general purpose computer such as computer 100 illustrated in FIG. 1, or in the form of bytecode class files executable within a Java™ runtime environment running on such a computer. A keyboard 110 and mouse 111 are coupled to a bi-directional system bus 118. The keyboard and mouse are for introducing user input to the computer system and communicating that user input to processor 113. Other suitable input devices may be used in addition to, or in place of, the mouse 111 and keyboard 110. I/O (input/output) unit 119 coupled to bi-directional system bus 118 represents such I/O elements as a printer, A/V (audio/video) I/O, etc.

Computer 100 includes a video memory 114, main memory 115 and mass storage 112, all coupled to bi-directional system bus 118 along with keyboard 110, mouse 111 and processor 113. The mass storage 112 may include both fixed and removable media, such as magnetic, optical or magnetic optical storage systems or any other available mass storage technology. Bus 118 may contain, for example, thirty-two address lines for addressing video memory 114 or main memory 115. The system bus 118 also includes, for example, a 32-bit data bus for transferring data between and among the components, such as processor 113, main memory 115, video memory 114 and mass storage 112. Alternatively, multiplex data/address lines may be used instead of separate data and address lines.

In one embodiment of the invention, the processor 113 is a microprocessor manufactured by Motorola, such as the 680×0 processor or a microprocessor manufactured by Intel, such as the 80×86, or Pentium processor, or a SPARC™ microprocessor from Sun Microsystems™, Inc. However, any other suitable microprocessor or microcomputer may be utilized. Main memory 115 is comprised of dynamic random access memory (DRAM). Video memory 114 is a dual-ported video random access memory. One port of the video memory 114 is coupled to video amplifier 116. The video amplifier 116 is used to drive the cathode ray tube (CRT) raster monitor 117. Video amplifier 116 is well known in the art and may be implemented by any suitable apparatus. This circuitry converts pixel data stored in video memory 114 to a raster signal suitable for use by monitor 117. Monitor 117 is a type of monitor suitable for displaying graphic images.

Computer 100 may also include a communication interface 120 coupled to bus 118. Communication interface 120 provides a two-way data communication coupling via a network link 121 to a local network 122. For example, if communication interface 120 is an integrated services digital network (ISDN) card or a modem, communication interface 120 provides a data communication connection to the corresponding type of telephone line, which comprises part of network link 121. If communication interface 120 is a local area network (LAN) card, communication interface 120 provides a data communication connection via network link 121 to a compatible LAN. Wireless links are also possible. In any such implementation, communication interface 120 sends and receives electrical, electromagnetic or optical signals which carry digital data streams representing various types of information.

Network link 121 typically provides data communication through one or more networks to other data devices. For example, network link 121 may provide a connection through local network 122 to local server computer 123 or to data equipment operated by an Internet Service Provider (ISP) 124. ISP 124 in turn provides data communication services through the world wide packet data communication network now commonly referred to as the "Internet" 125. Local network 122 and Internet 125 both use electrical, electromagnetic or optical signals which carry digital data streams. The signals through the various networks and the signals on network link 121 and through communication interface 120, which carry the digital data to and from computer 100, are exemplary forms of carrier waves transporting the information.

Computer 100 can send messages and receive data, including program code, through the network(s), network link 121, and communication interface 120. In the Internet example, remote server computer 126 might transmit a requested code for an application program through Internet 125, ISP 124, local network 122 and communication interface 120. In accord with the invention, one such downloaded application is the apparatus for selecting attachments described herein.

The received code may be executed by processor 113 as it is received, and/or stored in mass storage 112, or other non-volatile storage for later execution. In this manner, computer 100 may obtain application code in the form of a carrier wave.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

Embodiment of an Attachment Chooser Graphical User Interface (GUI)

In an embodiment of the invention, a sender initiates an attachment session by pressing a button or selecting an item from a menu (e.g., an "attach" button or menu item) presented by an e-mail application during composition of an e-mail message. The pressing of the button or selecting of the menu item in the e-mail application generates an event which initiates an attachment session and triggers the presentation of a new window or frame providing an attachment chooser GUI interface. Other mechanisms configured to invoke the attachment chooser GUI interface may be used as well.

Figure 4:
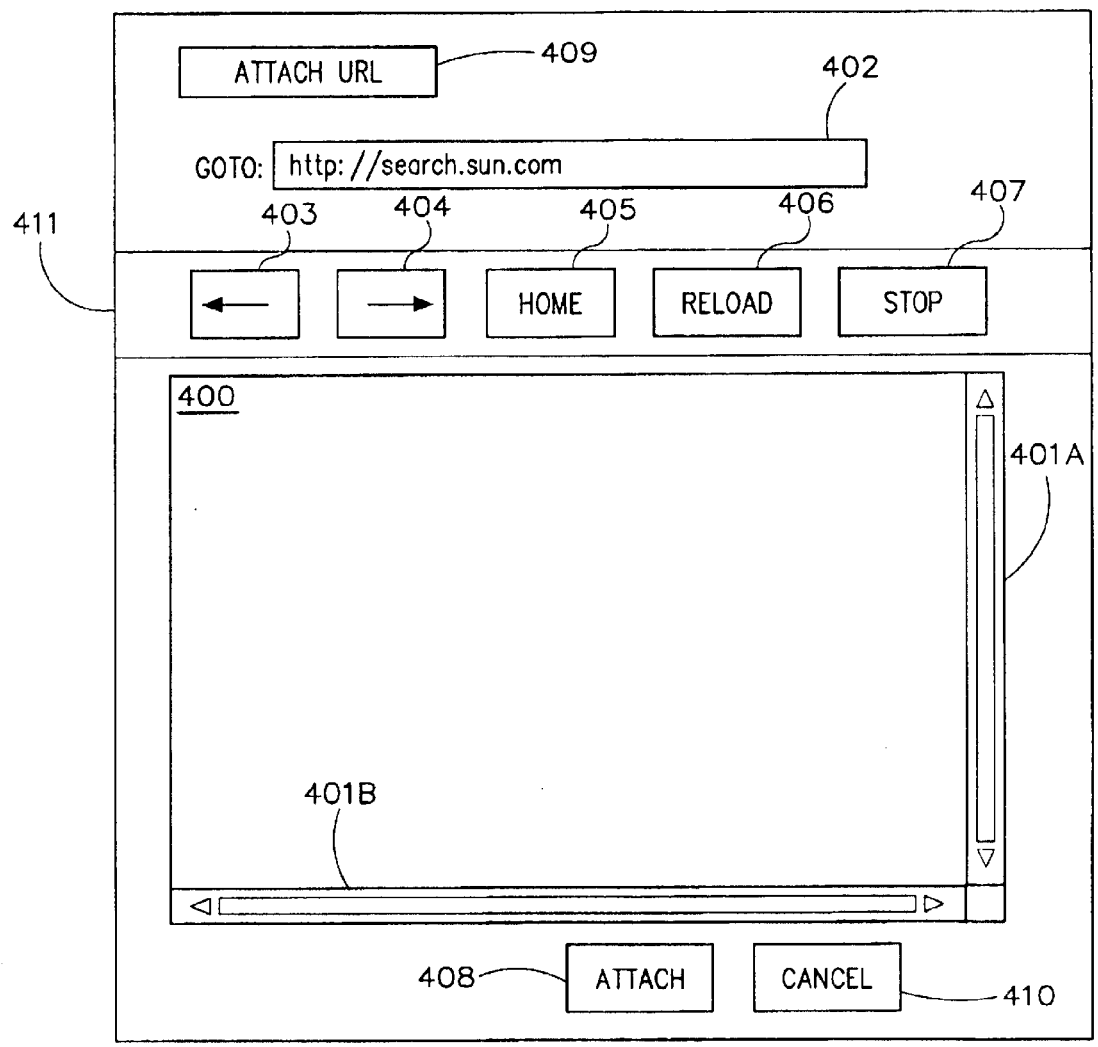
FIG. 4 is an illustration of a graphic user interface for a web attachment chooser in accordance with an embodiment of the invention.

An embodiment of an attachment chooser GUI interface in accordance with an embodiment of the invention is illustrated in FIG. 4. The attachment chooser GUI interface ("chooser interface") is configured as a web browser. To facilitate browsing, the chooser interface contains display region 400 in which the rendered data, such as HTML data, for a current web page is displayed. Display region 400 is configured as a scrollable display with vertical scrollbar 401A and horizontal scrollbar 401B. A "GoTo" field 402 is provided on the chooser interface which contains the resource locator (e.g., URL) of the current web page. "GoTo" field 402 is editable, permitting the sender to specify a particular resource locator. Entering a resource locator into "GoTo" field 402 causes the chooser interface to display the associated data resource (e.g., an associated web page is displayed in display region 400).

The chooser interface further comprises navigation toolbar 411, which is configured with basic navigation controls in the form of "previous page" button 403, "next page" button 404, "home" button 405, "reload" button 406 and "stop" button 407. Menu 409 provides a mechanism by which the sender can specify whether attachments selected with the chooser interface are to be attached as a simple resource locator or as the source data of the data resource associated with the resource locator. Menu 409 is configured with selectable states, with the currently selected state indicating the form an attachment will take (i.e., the "attachment type"). The current state of menu 409 in FIG. 4 specifies that attachments are to be attached as URL's.

Several control buttons are also provided on the chooser interface. "Attach" button 408, when activated, is configured to return an attachment associated with the currently displayed data resource to the e-mail application for attachment to the e-mail message being composed. The state of menu 409 is queried, when "attach" button 408 is activated, to determine how the attachment is to be returned to the e-mail application, e.g., as a URL or as an input stream containing the bits of the source data associated with the URL. "Cancel" (or "Done") button 410 is configured to dismiss the chooser interface when activated, ending the attachment session. A "help" button (not shown) may also be provided which, when activated, causes a web page containing chooser interface-related help information to be displayed in display region 400.

When the chooser interface is first displayed, the sender's home page (as specified in user preferences or by a default URL) is displayed in display region 400. Because there is no resource locator history when the attachment session begins, the previous/next page navigation buttons 403 and 404 are disabled. At this point, the sender can either type a new resource locator into "GoTo" field 402, or select a resource locator link contained in the displayed home page. When a link is selected, the chooser interface automatically displays the page or data resource associated with the selected link. The resource locator is extracted, and "GoTo" field 402 is updated.

When "previous page" button 403 is activated (e.g., when a mouse button is depressed while a mouse cursor is above button 403), a resource locator history is accessed to change the currently displayed data resource to the previously displayed data resource. Similarly, when "next page" button 404 is activated, the resource locator history is accessed to change the currently displayed data resource to the next data resource. "Previous page" button 403 is enabled once a resource locator history is established by browsing at least two data resources. When "previous page" button 403 is used to navigate backward through a resource locator history, "next page" button 404 is enabled to permit navigation forward through the resource locator history.

"Home" button 405 is configured to cause the sender's home page to be displayed in display region 400. "Reload" button 406 is configured to reload the current web page (or other current data resource). Reloading is particularly useful when the current web page contains data that is dynamically updated. "Stop" button 407 is configured to halt the loading of the current web page. "Stop" button 407 can be used to halt the download of large, undesired graphics files, or to stop animated graphics.

Embodiment of Software Apparatus for Selecting Attachments

An embodiment of the invention includes software apparatus comprising a component or collection of components configured to support an attachment chooser GUI interface, such as the chooser interface previously described with reference to FIG. 4. The components may be implemented as instances of object classes in accordance with known object-oriented programming practices, or the components may be implemented under one or more component model definitions. Several component model definitions are currently available, such as COM, CORBA, and the Java™ component scheme referred to as JavaBeans™.

Each component model provides for encapsulation of related functions and data structures into individual components, similar to what occurs under a standard object-oriented programming (OOP) approach. The particular mechanisms by which the components are managed and interact are defined according to the respective component model. Bridges (e.g., ActiveX) may be constructed which allow components designed under different component model definitions to interact within a single application. Interaction is typically performed through a set of methods implemented by the component. These sets of methods are referred to as "interfaces" in some component models. The public methods by which OOP object classes interact are often presented in the form of application programming interface (API) definitions.

To provide a better understanding of encapsulation of related data structures and methods, an overview of object-oriented programming is provided below.

Object-Oriented Programming

Object-oriented programming is a method of creating computer programs by combining certain fundamental building blocks, and creating relationships among and between the building blocks. The building blocks in object-oriented programming systems are called "objects." An object is a programming unit that groups together a data structure (one or more instance variables) and the operations (methods) that can use or affect that data. Thus, an object consists of data and one or more operations or procedures that can be performed on that data. The joining of data and operations into a unitary building block is called "encapsulation."

An object can be instructed to perform one of its methods when it receives a "message." A message is a command or instruction sent to the object to execute a certain method. A message consists of a method selection (e.g., method name) and a plurality of arguments. A message tells the receiving object what operations to perform.

One advantage of object-oriented programming is the way in which methods are invoked. When a message is sent to an object, it is not necessary for the message to instruct the object how to perform a certain method. It is only necessary to request that the object execute the method. This greatly simplifies program development.

Object-oriented programming languages are predominantly based on a "class" scheme. The class-based object-oriented programming scheme is generally described in Lieberman, "Using Prototypical Objects to Implement Shared Behavior in Object-Oriented Systems," OOPSLA 86 Proceedings, September 1986, pp. 214–223.

A class defines a type of object that typically includes both variables and methods for the class. An object class is used to create a particular instance of an object. An instance of an object class includes the variables and methods defined for the class. Multiple instances of the same class can be created from an object class. Each instance that is created from the object class is said to be of the same type or class.

To illustrate, an employee object class can include "name" and "salary" instance variables and a "set_salary" method. Instances of the employee object class can be created, or instantiated for each employee in an organization. Each object instance is said to be of type "employee." Each employee object instance includes "name" and "salary" instance variables and the "set_salary" method. The values associated with the "name" and "salary" variables in each employee object instance contain the name and salary of an employee in the organization. A message can be sent to an employee's employee object instance to invoke the "set_salary" method to modify the employee's salary (i.e., the value associated with the "salary" variable in the employee's employee object).

A hierarchy of classes can be defined such that an object class definition has one or more subclasses. A subclass inherits its parent's (and grandparent's etc.) definition. Each subclass in the hierarchy may add to or modify the behavior specified by its parent class. Some object-oriented programming languages support multiple inheritance where a subclass may inherit a class definition from more than one parent class. Other programming languages support only single inheritance, where a subclass is limited to inheriting the class definition of only one parent class. The Java™ programming language also provides a mechanism known as an "interface" which comprises a set of constant and abstract method declarations. An object class can implement the abstract methods defined in an interface. Both single and multiple inheritance are available to an interface. That is, an interface can inherit an interface definition from more than one parent interface.

An object is a generic term that is used in the object-oriented programming environment to refer to a module that contains related code and variables. A software application can be written using an object-oriented programming language whereby the program's functionality is implemented using objects. As previously discussed, the encapsulation provided by objects in an object-oriented programming environment may be extended to the notion of components under a component model definition.

Implementation in the Java™ Programming Language

An embodiment of the software apparatus of the invention is implemented in the Java™ programming language. The Java™ programming language is an object-oriented programming language with each program comprising one or more object classes. Unlike many programming languages, in which a program is compiled into machine-dependent, executable program code, Java™ classes are compiled into machine independent bytecode class files. Each class contains code and data in a platform-independent format called the class file format. The computer system acting as the execution vehicle supports the Java™ runtime environment. The runtime environment contains a program called a virtual machine, which is responsible for executing the code in Java™ classes.

Applications may be designed as standalone Java™ applications, or as Java™ "applets" which are identified by an applet tag in an HTML document, and loaded by a browser application. The class files associated with an application or applet may be stored on the local computing system, or on a server accessible over a network. Each class is loaded into the Java™ runtime environment, as needed, by the "class loader."

Java™ classes are loaded on demand from the network (stored on a server), or from a local file system, when first referenced during an application or applet's execution. The runtime environment locates and loads each class file, parses the class file format, allocates memory for the class's various components, and links the class with other already loaded classes. This process makes the code in the class readily executable by the virtual machine.

Java™ classes may also be incorporated into Java™ components referred to as "JavaBeans™". JavaBeans™ are designed in accordance with the JavaBean™ API Specification to allow for component-based application building. Bridges (e.g., ActiveX bridges) may be used with JavaBeans™ to allow JavaBeans™ to be used in other component model environments, such as OLE/COM and CORBA.

Support for features such as "introspection," "customization," "events," "properties" and "persistence" is provided within the JavaBean™ framework to facilitate application building and component use. "Introspection" permits builder tools to analyze how a particular bean works. "Customization" permits an application builder to customize the appearance and behavior of a bean. "Events" provide a simple communication metaphor that can be used to connect a bean with other application components or beans. "Properties" are used for bean customization and programmatic use. "Persistence" allows for a bean to have its customized state saved and reloaded later. These features are discussed in the JavaBean™ API Specification, Version 1.01, by Sun Microsystems (1997), which is available on the World Wide Web at the URL, "http://java.sun.com/beans/spec.html", and is incorporated herein by reference.

Embodiments of the software apparatus may be implemented using standard OOP object classes or using components under a known component model definition. For the purposes of the following description, references to components may refer to instances of OOP object classes or components under a known component model.

Implementation of Software Apparatus

Figure 5A:
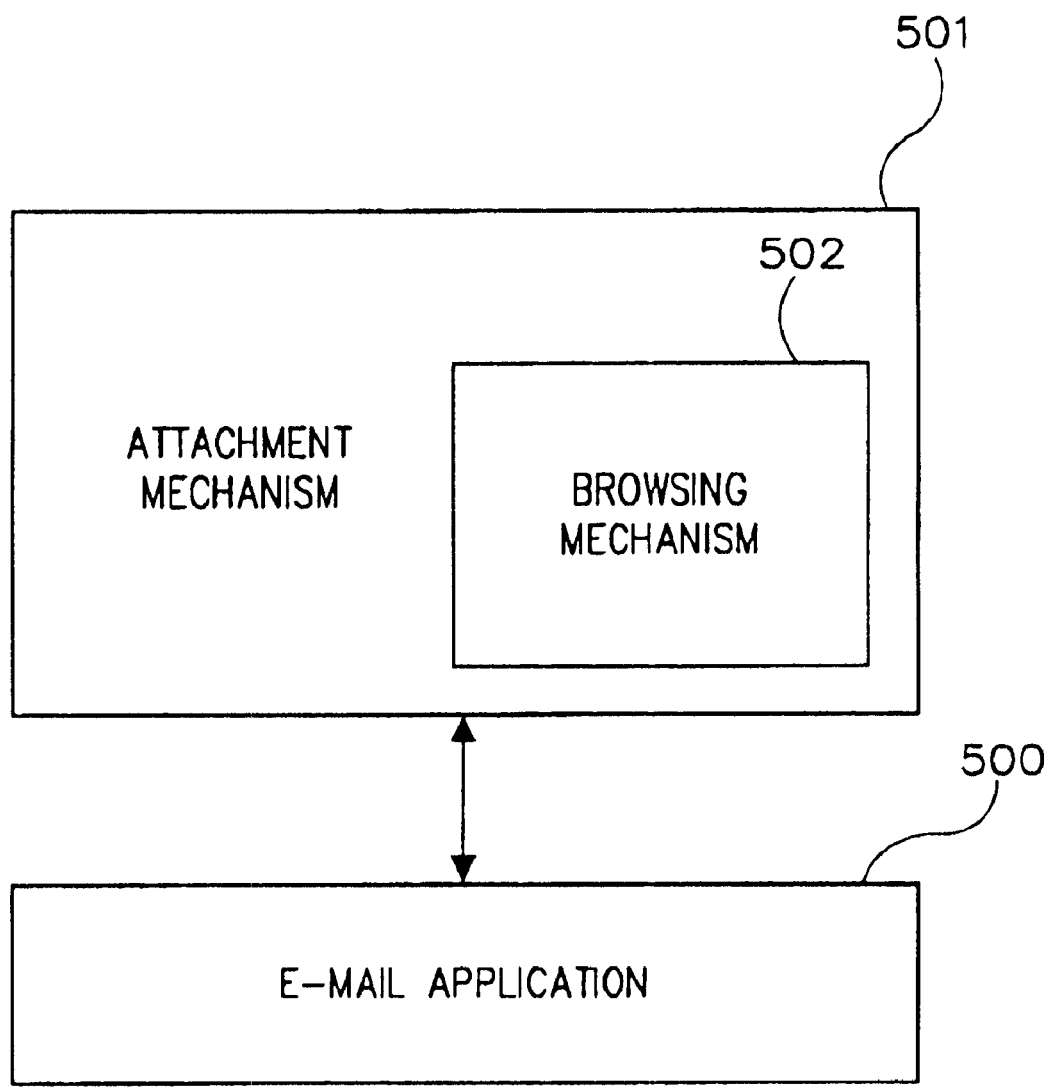
FIG. 5A is a block diagram of an attachment mechanism and browsing mechanism in accordance with an embodiment of the invention.

FIG. 5A is a block diagram of an apparatus for selecting attachments in accordance with an embodiment of the invention. The apparatus comprises an attachment mechanism 501 and a browsing mechanism 502 coupled to an e-mail application 500, wherein each mechanism may comprise hardware, software, firmware and/or any other suitably-configured element. Browsing mechanism 502 is configured to display data resources to a sender for consideration as attachments in an e-mail message under composition within e-mail application 500. Browsing mechanism is also configured to respond to user input to navigate between data resources, such as through resource locators embedded in the displayed data resources.

Attachment mechanism 501 is configured to respond to user input selecting a currently displayed data resource for attachment by retrieving the attachment from browsing mechanism 502, and providing the attachment to e-mail application 500. The attachment may be retrieved in the form of different attachment types. For example, the attachment may be retrieved as a resource locator associated with the currently displayed data resource, or as all of or a subset of the source data of the currently displayed data resource. Attachment mechanism 501 may be further configured to respond to user input to select the attachment type.

Figure 5B:
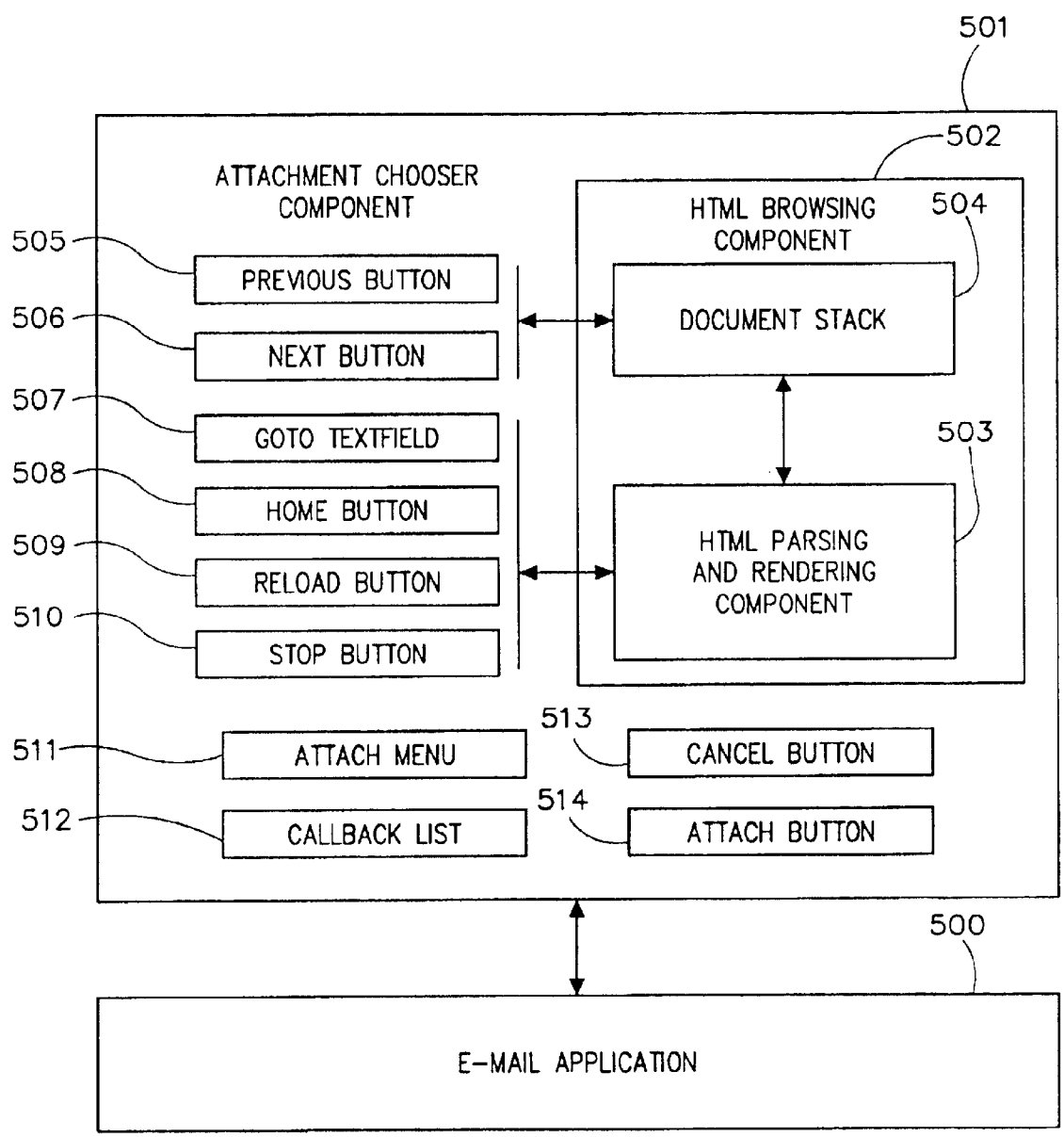
FIG. 5B is a block diagram of a software component configuration for a web attachment software component in accordance with an embodiment of the invention.

An embodiment of the apparatus of FIG. 5A is illustrated in FIG. 5B in the form of software components. In the embodiment of FIG. 5B, attachment mechanism is implemented as attachment chooser 501, whereas browsing mechanism 502 is implemented as HTML browsing component 502. The embodiment of FIG. 5B is directed to HTML-based data resources, though it will be obvious to one skilled in the art that embodiments of the invention may be similarly implemented for other forms of data resources.

FIG. 5B illustrates software apparatus for implementing an attachment chooser GUI interface in accordance with an embodiment of the invention. The software apparatus include e-mail application (or applet) 500 and attachment chooser component 501. E-mail application 500 and attachment chooser component 501 interact via messages and events. Attachment chooser component 501 comprises components 502–510, which are configured to implement the individual features of the attachment chooser GUI interface that are related to browsing. Attachment chooser component 501 further comprises components 511–514, which assist in the interaction between e-mail application 500 and attachment chooser component 501, or provide control over attachment chooser component 501.

The individual components of attachment chooser component 501 comprise multiple button components 505–506, 508–510 and 513–514 corresponding to the displayed buttons on the chooser GUI interface illustrated in FIG. 4. The button components receive a "buttonPushed" event when the corresponding graphic representation of the button on the chooser GUI interface is clicked (i.e., a mouse button is pressed while a cursor is within the bounds of the button representation). Receipt of the buttonPushed event can be used to trigger a particular action or set of actions. For the case of browser-related button components 505–506 and 508–510, the buttonPushed event is used to invoke a corresponding method of HTML browsing component 502, wherein methods for navigating the web and for parsing and rendering HTML data are implemented.

Component 511 is an "attach" menu in support of element 409 of FIG. 4. "Attach" menu 511 allows a user to select a current menu state from a set of possible menu states. For this embodiment, the set of possible menu states include "URL" and "InputStream" (or "Source"), which define the form an attachment is to take (i.e., the "attachment type") when the attachment is selected. "Attach" menu 511 includes an access method by which attachment chooser component 501 can query the menu state at the time an attachment is selected.

Component 507 is an editable "goto" textfield in support of element 402 of FIG. 4. Textfield 507 displays the URL of the current web page. In order to update the displayed URL, textfield 507 receives events from HTML browsing component 502 when the web page displayed by HTML browsing component 502 changes, for example, through selection of a link within a displayed web page. Also, textfield 507 can receive user input specifying a new URL, in which case, textfield 507 invokes an access method of HTML browsing component 502, such as setDocumentURL(URL url), to update the current document property in the HTML browsing component 502. Invoking the access method of HTML browsing component 502 causes the browsing component to navigate to the new URL.

Component 512 is a callback list that includes each component or application that registers with attachment chooser component 501 as an "ActionListener." Callback list 512 is used by "attach" button 514 to deliver events when the "attach" button 514 (supporting element 408 of FIG. 4) is activated by a buttonPushed event. For this embodiment, e-mail application 500 is part of callback list 512, and is therefore informed through a callback event when the "attach" button is activated. E-mail application 500 responds to the callback event by retrieving the attachment from attachment chooser component 501 through an API call.

Component 513 is a "cancel" button in support of element 410 of FIG. 4. When a buttonPushed event is received, "cancel" button 513 dismisses attachment chooser component 501, removing the chooser GUI interface from display. In some embodiments, "cancel" button 513 may also be used to initiate a shutdown of attachment chooser component 501, including the release of memory allocated to attachment chooser component 501 and its associated underlying components.

As previously stated, methods for navigating and for parsing and rendering HTML data are implemented within HTML browsing component 502. In FIG. 5B, an HTML parsing and rendering component 503 and a document stack component 504 cooperate to form HTML browsing component 502. HTML parsing and rendering component 503 derives from a scrollable panel class and is configured to support the display region 400 and scrollbars 401A and 401B of FIG. 4. Document stack 504 maintains the browser history in the form of a stack of URL's, providing the record necessary for the forward and back navigation familiar to web browsers. When a link is selected within a web page, HTML parsing and rendering component 503 navigates to the new web page designated by the link, and sends an event to document stack 504, so that document stack 504 knows to push the URL of the new web page onto the stack.

Component 505 is a "previous" button in support of element 403 of FIG. 4. "Previous" button 505 is set to activate a previousDocument() method of document stack 504 when a buttonPushed event is received. In response, document stack 504 sends an event to HTML parsing and rendering component 503 indicating that it should go to the previous web page. Component 506 is a "next" button in support of element 404 of FIG. 4. "Next" button 506 is set to activate a nextDocument() method of document stack 504 when a buttonPushed event is received. In response, document stack 504 sends an event to HTML parsing and rendering component 503 indicating that it should go to the next web page. Properties within document stack 504 indicate whether a "previous page" or a "next page" are available. Access methods for these properties may be used to control the enablement of "previous" button 505 and "next" button 506.

Components 508–510 are a "home" button, "reload" button and "stop" button in support of elements 405, 406 and 407, respectively, of FIG. 4. Similarly to buttons 505 and 506, buttons 508–510 are set to activate corresponding methods within HTML browsing component 502 when a buttonPushed event is received. Specifically, button 508 invokes the setDocumentURL(URL url) method, designating the sender's home page URL; button 509 invokes a reload() method; and button 510 invokes a stop() method. In this embodiment, the setDocumentURL(), reload() and stop() methods are implemented in HTML parsing and rendering component 503.

In an embodiment of the invention, the button, menu and textfield components may be implemented using pre-defined object classes from the Java™ Abstract Windowing Toolkit (AWT) package, including a textfield class, a menu class, and a button class. Also, in an embodiment of the invention, the HTML parsing and rendering component 503 and document stack 504 may be implemented with the HotJava™ HTML Component and the Document Stack Bean specified for the HotJava™ Browser. Documentation for the Document Stack Bean and the HotJava HTML Component are provided herein as Appendix A. The respective API's of the Document Stack Bean and the HotJava HTML Component may be referenced therein. It will be obvious to one skilled in the art that other known or user-defined components or combinations of components may also be used to implement the components of the software apparatus illustrated in FIG. 5B.

Attachment chooser component 501 presents the following API to e-mail application 500:

public void addActionListener(ActionListener l)
Registers a callback when the "attach" button component is activated.
public void removeActionListener(ActionListener l)
Deregister the "attach" button component callback.
public Object getAttachment()
Returns either a URL or an InputStream, depending on the state of the menu component.
public String getName()
Returns the name of the attachment.
public void setURL(URL u)
Explicitly sets the location displayed by the chooser GUI interface.

The addActionListener() and removeActionListener() are methods available to e-mail application 500 (and other components) to subscribe or unsubscribe to callback list 512. Those components that are registered as an ActionListener will receive a callback event when "attach" button 514 is activated. Receipt of the callback event generated by "attach" button 514 indicates that the sender has selected the current web page as an attachment.

The getAttachment() method is used by e-mail application 500 to retrieve an attachment after receipt of a callback event from "attach" button 514. When getAttachment() is called, attachment chooser component 501 queries the menu state of "attach" menu 511 to determine the attachment type. If the menu state indicates "URL," then attachment chooser component 501 invokes the getDocumentURL() method of HTML browsing component 502 to extract and return the URL of the current web page. If the menu state indicates "InputStream" (or "Source"), then attachment chooser component 501 invokes the getDocumentSource() method of HTML browsing component 502 to extract and return the source data of the current web page as an input stream. This scheme can be expanded to similarly include attachments in the form of selections from a web page (e.g., user highlighted portions of a page), or in the form of indicated elements whose value is a link under a cursor.

The getName() method is used by e-mail application 500 to extract the name or title of a current document to associate with an attachment previously extracted using the getAttachment() method. The setURL() method provides a mechanism by which the e-mail application can specify a URL to be viewed.

Figure 6:
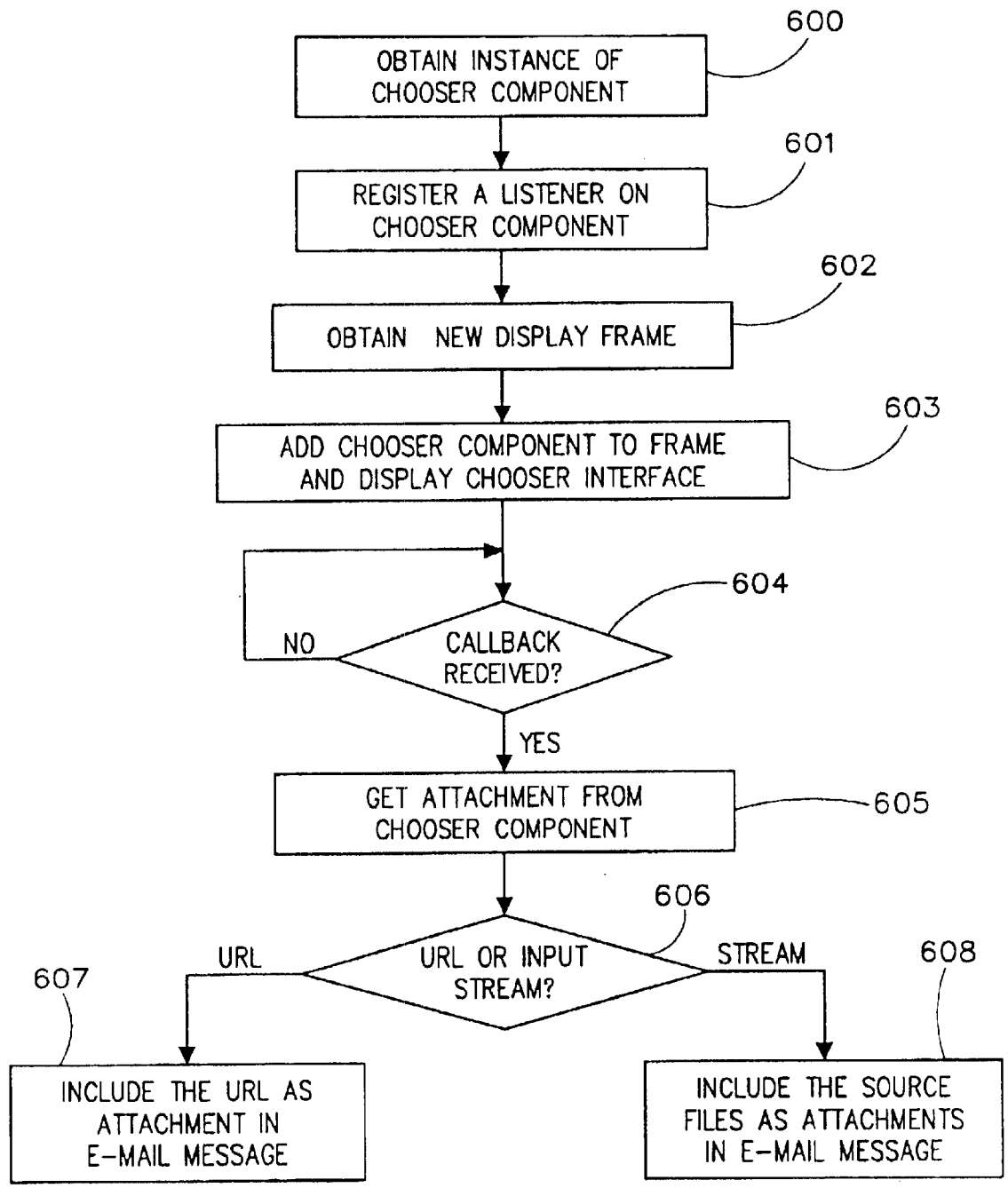
FIG. 6 is a flow diagram of a process for an e-mail application to interact with an attachment chooser component in accordance with an embodiment of the invention.

FIG. 6 is a flow diagram of a process whereby an e-mail application instantiates an attachment chooser component and retrieves an attachment in accordance with an embodiment of the invention. In step 600, the e-mail application obtains an instance of the attachment chooser component. Step 600 may comprise calling a constructor method of the attachment chooser component. In step 601, the e-mail application registers itself as a listener on the attachment chooser component, such as by invoking the addActionListener() method of the attachment chooser component. In step 602, the e-mail application obtains an instance of a frame, and, in step 603, adds the attachment chooser component to the frame to display the GUI interface of the attachment chooser component.

At step 604, the e-mail application waits for receipt of a callback event from the attachment chooser component. After the callback event is received, indicating that the sender has selected an attachment, the e-mail application retrieves the attachment from the attachment chooser component in step 605, for example, by invoking a getAttachment() method. In step 606, a branching occurs based on whether the retrieved attachment object is an object of type URL or an object of type InputStream. If the attachment is a URL object, in step 607, the attachment is included as a URL in the e-mail message under composition. If the attachment is an InputStream object, in step 608, the attachment is included as source files in the e-mail message.

Thus, a method and apparatus for selecting attachments has been described in conjunction with one or more specific embodiments. The invention is defined by the claims and their full scope of equivalents.

What is claimed is:

1. An apparatus comprising:
a web browsing mechanism configured to render a current data resource in a display region of a graphical user interface, said current data resource comprising at least one current document, said web browsing mechanism configured to navigate through a plurality of data resources, said web browsing mechanism configured to be initiated from within an e-mail mechanism;

a selection mechanism configured to select a portion of said current document in response to a user input; and an attachment mechanism configured to retrieve an attachment from said selection mechanism and attach said attachment to an e-mail message in response to a user event, said attachment associated with said portion of said current document.

2. The apparatus of claim 1, wherein said attachment comprises a resource locator associated with said current document.

3. The apparatus of claim 1, wherein said attachment comprises source data associated with said current document.

4. The apparatus of claim 1, wherein said attachment mechanism is configured to select an attachment type of said attachment.

5. The apparatus of claim 1, wherein said attachment mechanism comprises a button on said graphical user interface.

6. The apparatus of claim 1, wherein said web browsing mechanism is configured to navigate to a first data resource using a resource locator in a second data resource.

7. A method for selecting attachments comprising:

initiating an attachment selection mechanism from within an e-mail mechanism;

displaying a graphical user interface having a web browsing mechanism configured to render a data resource and having a selecting mechanism configured to select a portion of a desired data resource, the graphical user interface being displayed in response to initiating the attachment selection mechanism;

browsing through one or more data resources using said web browsing mechanism to determine a desired data resource, said desired data resource comprising at least one current document;

selecting said portion of said current document using said selecting mechanism; and retrieving an attachment from said selecting mechanism and attaching said attachment to an e-mail message, said attachment associated with said portion of said current document.

8. The method of claim 7, further comprising the step of selecting a type of said attachment, the type of said attachment being either a resource locator or source data.

9. The method of claim 7, wherein said step of retrieving said attachment comprises retrieving a resource locator of said current document.

10. The method of claim 7, wherein said step of retrieving said attachment comprises retrieving source data associated with said current document.

11. The method of claim 7, wherein said step of browsing comprises the step of navigating a resource locator in said documents.

12. A computer program product comprising:

a computer usable medium having computer readable code embodied therein for selecting an attachment, said computer program product comprising:

computer readable code configured to initiate an attachment selection mechanism from within an e-mail application;

computer readable code configured to cause a computer to display a graphical user interface in response to initiation of the attachment selection mechanism, the graphical user interface having a web browsing mechanism configured to render a data resource and having a selecting mechanism configured to select a portion of said data resource;

computer readable code configured to cause a computer to respond to user input to browse through one or more data resources using said web browsing mechanism, said data resources comprising at least one current document;

computer readable code configured to cause a computer to respond to user input to select said portion of said current document using said selecting mechanism; and computer readable code configured to cause a computer to retrieve an attachment from said selecting mechanism and attach said attachment to an e-mail message, said attachment associated with a current document.

13. The computer program product of claim 12, further comprising computer readable code configured to cause a computer to receive user input to select a type of said attachment, the type of said attachment being either a resource locator or source data.

14. The computer program product of claim 12, wherein said computer readable code configured to cause a computer to retrieve said attachment comprises computer readable code configured to cause a computer to retrieve a resource locator of said current document.

15. The computer program product of claim 12, wherein said computer readable code configured to cause a computer to retrieve said attachment comprises computer readable code configured to cause a computer to retrieve source data associated with said current document.

16. The computer program product of claim 12, wherein said computer readable code configured to cause a computer to respond to user input to browse comprises computer readable code configured to cause a computer to navigate a resource locator in said documents.

17. A memory configured to store data for access by a computer system, comprising:

a data structure stored in said memory and associated with a graphical user interface, said data structure comprising:

a web browsing component comprising:

one or more methods configured to render a current data resource, said current data resource comprising at least one current document;

one or more navigation methods configured to navigate between a plurality of data resources;

one or more navigation components configured to invoke said one or more navigation methods of said web browsing component in response to user input;

one or more selecting components configured to select a portion of said current document in response to a user input; and an attachment component comprising a method configured to retrieve an attachment from said selecting component and attach said attachment to an e-mail message in response to a user input, said attachment associated with said current document.

18. The memory of claim 17, wherein said attachment comprises a resource locator of said current document.

19. The memory of claim 17, wherein said attachment comprises source data associated with said current document.

20. The memory of claim 17, where in said data structure further comprises:
a property which determines a type of said attachment; and
a selection method configured to allow a user to select a value of said property.

21. The memory of claim 17, wherein said one or more navigation methods are configured to navigate a resource locator in a data resource in response to a user input.

22. The memory of claim 17, wherein said web browsing component further comprises:
a stack configured to contain resource locators of navigated data resources; and
one or more methods configured to browse said navigated data resources by stepping forward and backward within said stack.

23. An apparatus comprising:
a web browsing means for rendering a current data resource in a display region of a graphical user interface, said current data resource comprising at least one current document, said web browsing means for navigating through a plurality of data resources;
means for selecting a portion of said current document in response to user input; and
means for retrieving an attachment from said selecting means and attaching said attachment to an e-mail message in response to a user event, said attachment associated with said current document.

24. A memory configured to store data for access by a computer system, comprising:
a data structure stored in the memory and associated with a graphical user interface, the data structure comprising:
a browsing component including:
one or more methods configured to render a current data resource, the current data resource including at least one current document;
one or more navigation methods configured to navigate between a plurality of data resources;
one or more navigation components configured to invoke the one or more navigation methods of the browsing component in response to user input;
one or more selecting components configured to select a portion of the current document in response to a user input;
an attachment component including a method configured to retrieve an attachment from the selecting component and attach the attachment to an e-mail message in response to a user input, the attachment associated with the current document; and
an attachment type selection component configured to allow selection of a property which determines a type of the attachment.

25. The memory of claim 24, wherein the attachment includes a resource locator of the current document.

26. The memory of claim 24, wherein the attachment includes source data associated with the current document.

27. The memory of claim 24, wherein the one or more navigation methods are configured to navigate a resource locator in a data resource in response to a user input.

28. The memory of claim 24, wherein the web browsing component further comprises:
a stack configured to contain resource locators of navigated data resources; and
one or more methods configured to browse the navigated data resources by stepping forward and backward within the stack.

29. An apparatus comprising:
a web browsing mechanism configured to render a current data resource in a display region of a graphical user interface, the current data resource comprising at least one current document, the web browsing mechanism configured to navigate through a plurality of data resources, the web browsing mechanism configured to be initiated from within an e-mail mechanism;
a selection mechanism configured to select a portion of the current document in response to a user input;
an attachment mechanism configured to retrieve an attachment from the selection mechanism and attach the attachment to an e-mail message in response to a user event, the attachment associated with the portion of the current document; and
an attachment type selection mechanism configured to provide for selection of a form of the attachment.

30. The apparatus of claim 29, wherein the form of the attachment is defined as a resource locator.

31. The apparatus of claim 29, wherein the form of the attachment is defined as source data.

32. The apparatus of claim 29, wherein the web browsing mechanism, the selection mechanism, the attachment mechanism, and the attachment type selection mechanism are each configured to be initiated from within an email application.

33. The apparatus of claim 29, wherein the web browsing mechanism is configured to navigate to a first data resource using a resource locator in a second data resource.

34. A method for selecting attachments comprising:
initiating an attachment selection mechanism from within an e-mail mechanism;
displaying a graphical user interface having a web browsing mechanism configured to render a data resource and having a selecting mechanism configured to select a portion of a desired data resource, the graphical user interface being displayed in response to initiating the attachment selection mechanism;
browsing through one or more data resources using the web browsing mechanism to determine a desired data resource, the desired data resource including at least one current document;
selecting a portion of the current document using the selecting mechanism;
retrieving an attachment from the selecting mechanism, the attachment being associated with the portion of the current document;
selecting a form of the attachment; and
attaching the attachment to an e-mail message in accordance with the form of the attachment as selected.

35. The method of claim 34, wherein the form of the attachment is represented as either a resource locator or source data.

36. The method of claim 34, wherein retrieving the attachment from the selecting mechanism includes retrieving a resource locator of the current document.

37. The method of claim 34, wherein retrieving the attachment from the selecting mechanism includes retrieving source data associated with the current document.

38. The method of claim 34, wherein browsing includes navigating through one or more resource locators.

* * * * *